June 30, 1942.  B. T. WALL  2,288,501
AIRPLANE
Filed Oct. 9, 1940  2 Sheets-Sheet 1
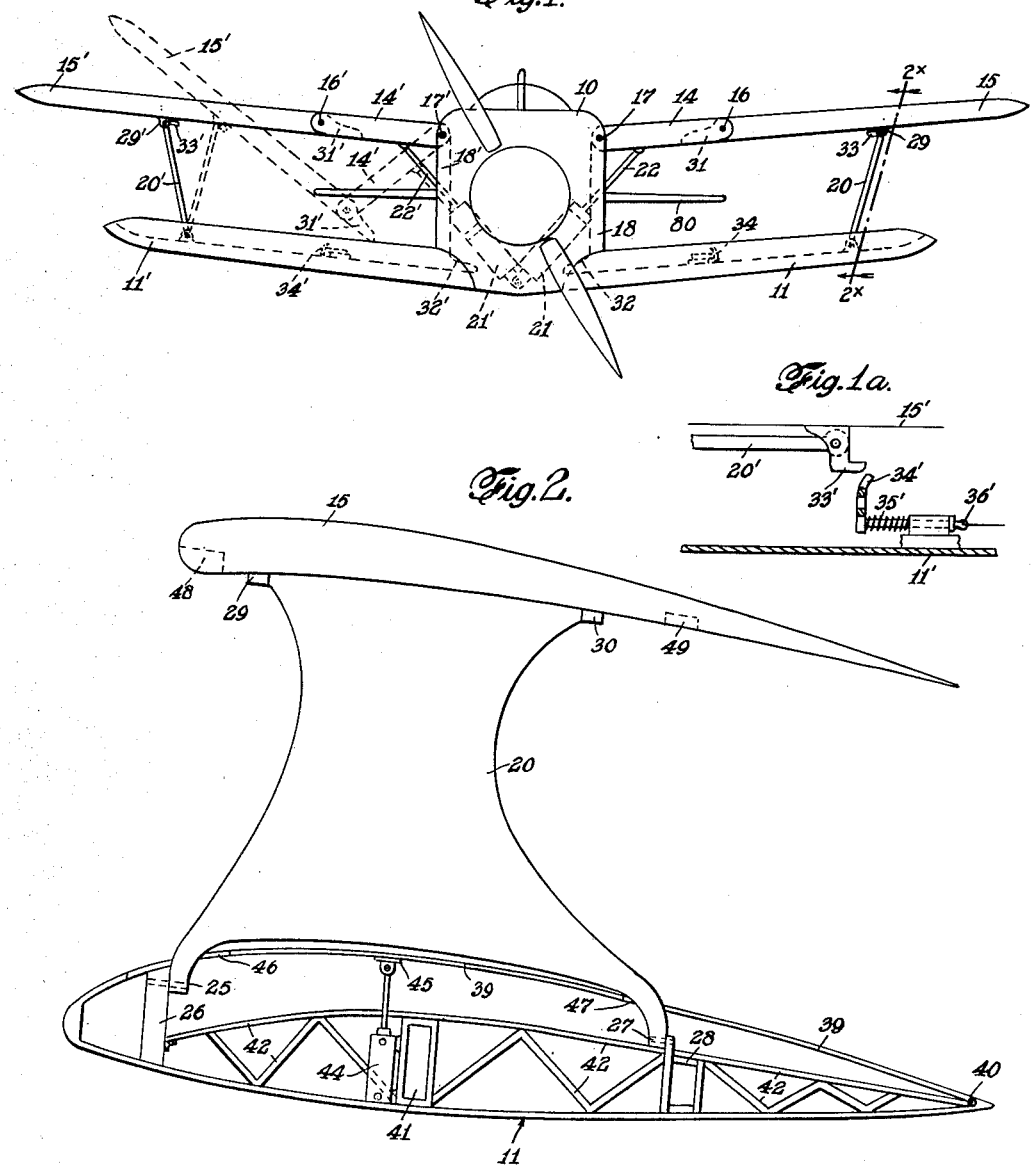
INVENTOR.
Byron T. Wall
BY Williams, Rich & Morse
ATTORNEYS.

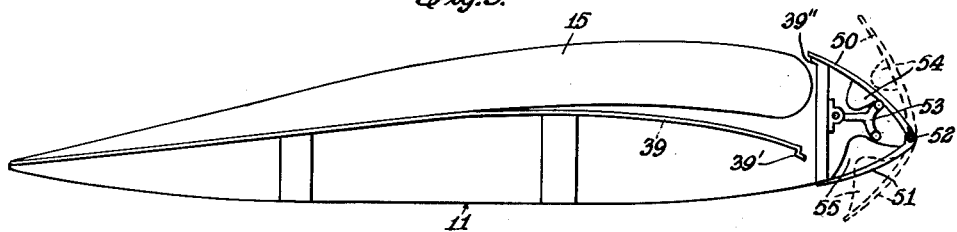
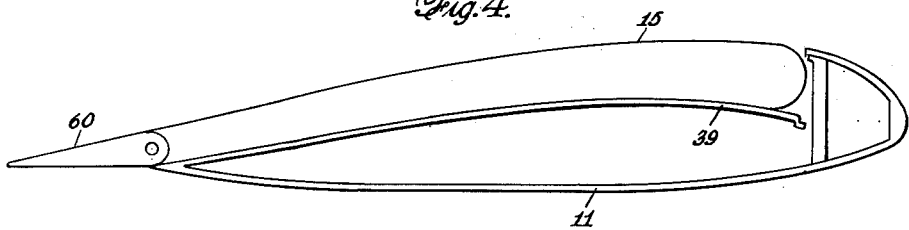
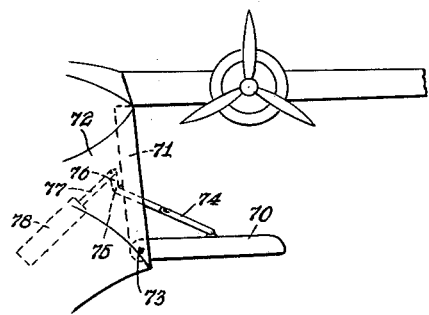

Patented June 30, 1942

2,288,501

UNITED STATES PATENT OFFICE 2,288,501

AIRPLANE

Byron T. Wall, Raymond, Alberta, Canada, assignor of one-half to Hamilton Hagar, Larchmont, N. Y.

Application October 9, 1940, Serial No. 360,373
In Canada October 10, 1939

8 Claims. (Cl. 244—49)

This invention relates to airplanes and more particularly to an airplane in which the wing area may be increased and decreased at will.

It is well known that lift in an airplane is a function of wing area, other things being equal. An airplane that will take off at 50 miles per hour and fly at 150 miles per hour, for example, has more wing area than is required to sustain flight at the higher speed. This excess wing area increases the drag which, if removed, would increase the speed. But to reduce the wing area would ordinarily mean higher speed required for take off and landing, both of which are limited by practical considerations such as the size and surfacing of landing fields, the load carried, etc.

It is the principal object of this invention to provide an airplane of increased flight range which can take off and land at relatively lower speeds or with greater loads, the wing area, wing drag and some of the parasitic drag being capable of reduction after the airplane is in flight, so as to increase its top speed, and capable also of being increased again for slower flight and landing.

Another object is to provide a monoplane which can be converted into a biplane, and vice versa, while in flight, thus increasing and decreasing the wing area by very large amounts.

Further objects are to provide means for providing lateral control while in flight, means for effecting the change from monoplane to biplane, and means for locking the auxiliary wings in closed position when the airplane is functioning as a monoplane. Other objects will appear in the course of the following description.

For a better understanding of the invention reference is made to the following specification describing the present preferred embodiments thereof, in conjunction with the drawings in which:

Fig. 1 is a front view of an airplane showing one form of the invention, the full lines illustrating the parts arranged to form a biplane and the dotted lines at the left hand side showing the upper wing in a state of transition from the biplane to the monoplane position or vice versa.

Fig. 1a is a detail of locking means securing the auxiliary wing in closed position.

Fig. 2 is a section through the wings looking longitudinally thereof and showing the wings and strut in the extended or biplane position.

Fig. 3 is a section through the wings in monoplane position, showing, more or less diagrammatically, the folded arrangement and also novel means for providing lateral control.

Fig. 4 is similar to Fig. 3 and shows how the conventional type of trailing-edge aileron may be utilized in conjunction with the invention.

Fig. 5 shows a modified form of the invention in which an auxiliary wing is extended outwardly and downwardly from the fuselage below the fixed wing, serving also as a sponson.

Referring to Fig. 1, I have shown an airplane embodying the preferred form of my invention. To the fuselage 10 are permanently secured lower wings 11 and 11' in the position usually occupied by the wings of a low-wing monoplane.

Above the lower wings 11 and 11' are shown the upper or auxiliary wings in their opened or biplane position. These wings consist of two sections 14, 14' and 15, 15' pivotally connected at 16 and 16'. The inner sections 14, 14' are pivotally connected to the upper part of the fuselage at 17, 17' and are adapted to be folded against the fuselage, which may have depressions 18, 18' to receive them, at least in part, so as to minimize drag. The outer or main sections 15, 15' of the upper wings, in addition to their connection to sections 14, 14' are supported intermediate their ends by struts 20, 20' which are pivoted both to sections 15, 15' and to the lower wings 11, 11'.

At the left side of Fig. 1 the upper auxiliary wing is shown in dotted lines in a transitory position between its folded and open positions. It is to be understood that both of the upper wings are moved in synchronism and go up and down together so that the wing area presented is equal and symmetrically arranged on both sides at all times.

The mechanism for raising and lowering the upper wings may be either mechanically or hydraulically operated and synchronized. I have shown a pair of pivotally mounted hydraulic cylinders 21, 21' which elevate and retract arms 22, 22' connected to the inner sections 14 and 14'. The actuating means, be it hydraulic or otherwise, should provide positive control throughout the range of movement of the upper wings.

It will be observed that in its transitory position as shown at the left of Fig. 1 the upper wing sections provide an exaggerated dihedral during the change-over, thereby adding greatly to the stability of the airplane during the changeover.

Referring to Fig. 2, the struts 20, 20' on each side of the airplane are preferably of considerable width, and suitably streamlined from front to rear, so that their pivotal connections to the upper and lower wings are spaced apart. The strut 20 is pivoted at 25 to a forward spar 26 and at 27 to a rear spar 28 of the lower wing 11, both of these pivot points being within the body of the wing. The points of attachment of strut 20 to the upper wing section 15 are preferably below its under surface as shown at 29, 30 so that when folded the strut lies wholly below the upper wing.

As shown in Fig. 1, starting with the upper wing in its opened position, when the arm 22' is retracted by cylinder 21' it swings section 14' downwardly on pivot 17' so that the outer end of section 15 is tilted upwardly about the strut 20' as a fulcrum, thus increasing the dihedral. As section 14' approaches the fuselage, section 15' and strut 20' fold down into the lower wing 11', which is adapted to receive them.

Locking of the upper wing section in closed position, with section 14' against the fuselage and section 15' against the lower wing 11', is accomplished as follows: Positive control of the piston in cylinder 21' holds the inner section 14' against the fuselage; the inner end of the outer section 15' is provided with an extended segment 31' which fits into a pocket 32' at the lower part of the fuselage; the upper section 15' is provided with a lug 33' which engages a latch 34' in the lower wing 11' (see Fig. 1a). This latch may be actuated to lock by a spring 35' and may be unlocked by a cable 36' which leads into the cockpit. The lug 33' may be incorporated as a part of the bracket 29' by which the strut 20' is connected to the upper wing section 15'.

In the biplane position the segments 31, 31' also serve to give rigidity to the upper wing as a whole as they overlap corresponding portions of the inner sections 14, 14' which are formed to receive them.

Referring to Fig. 2, the upper surface of lower wing 11 in rear of the forward spar 26 is a thin, ribbed deck 39 of the desired contour, pivoted at its trailing edge 40 to the main supporting structure of the wing which comprises the spars 26, 28 and 41 and internal rib and bracing structures 42. The space between the rib structures 42 and the top surface of the wing is sufficient to receive the upper wing section 15 and the strut 20, and to make this space available the deck 39 is rotated downwardly on its pivot 40 until it occupies a position within the wing 11 adjacent the tops of the ribs. To raise and lower deck 39 one or more hydraulic actuators 44 may be disposed within the wing at suitable points and connected to a rib 45 running transversely of the wing and secured to the underside of the deck 39. The operation of actuators 44 may readily be suitably coupled with the operation of cylinders 21, 21' so that the parts are moved in the proper relative sequence.

The deck 39 is provided with openings 46, 47 to accommodate the legs of strut 20 and wing 15 has suitable pockets 48, 49, which may be provided with collapsible flaps (not shown) to enable it to move past the pivotal points 25, 27 of the strut when folded. The deck 39 is formed at its forward edge with a step 39' (Fig. 3) which locks under a complementary step 39" which prevents its being moved above its proper position.

In Fig. 3 the wings are shown in the folded position which they occupy when the airplane is operating as a monoplane. In addition, novel means for effecting lateral control of the airplane is shown which eliminates the necessity of using the usual type of trailing edge aileron. At the leading edge of the wing, two flaps 50 and 51 are pivoted at 52. These flaps have the same contour as the wing and normally lie against it, in which position they may be held by any suitable means. They are actuated by means of the pivoted controllable lever 53 which operates against either of the cams 54 or 55 secured to the flaps, depending upon the direction in which lever 53 is moved. The flaps 50 and 51, instead of being capable of alternative operation, may have controls capable of operating them simultaneously or the leading edge may be provided with only one flap on either its upper or lower face. It will readily be understood that the movement of such flap or flaps will alter the air flow over the surface of the wing and the pressure, either positive or negative, which results from that flow. In consequence, the lift will be changed and a rolling moment impressed on the airplane provided that the lift of one wing is changed relative to the lift of the other. This will give lateral control of the airplane.

In Fig. 4 another form of wing arrangement is shown in which a conventional type of aileron 60 is applied to the trailing edge of the upper wing 15 so as to extend beyond the trailing edge of the lower wing 11 when the wings are folded together. The aileron is thus capable of functioning when the wings are in either the monoplane or biplane positions. It is understood that aileron controls are provided within wing 15 and are adapted to fold with it while remaining operative.

Fig. 5 shows a modification of the invention in which a high wing monoplane is capable of being transformed into a biplane by lowering an auxiliary wing 70 from a recess 71 in the fuselage 72 to which the wing is pivoted at 73. It is shown as applied to a flying boat and by constructing the auxiliary wing 70 to be water tight and of sufficient strength it serves not only as a wing but also as a sponson. The wing 70 is moved to and from its open position by means of one or more centrally pivoted arms 74, the inner legs of which are pivoted in the fuselage at 75 and connected to cranks 76 actuated by the piston rod 77 of a suitable hydraulic device 78.

In the operation of any form of the invention when a conversion is made from a monoplane to biplane there will be a shift in the centers of lift and drag for which it may be necessary to compensate by changing the angle of incidence of the stabilizer 80 (Fig. 1). This change may be made automatically by any suitable arrangement which is actuated simultaneously with the wing actuating mechanism.

In the operation of an airplane embodying the invention, the auxiliary wings would be raised to form a biplane prior to take off. This gives a plane having wing area and lift greatly in excess of that required to maintain flight because the lower wing alone is sufficient to support the plane once it is in the air and has reached a sufficient speed. This increase in lift greatly decreases the speed required for take off and consequently the plane will require a much shorter run and can get out of smaller fields. Once in the air and flying at a speed at which the lower wings alone will sustain flight, the upper wings are retracted and merged with the fuselage or the fuselage and lower wings. Substantially all drag due to the upper wings and the interwing struts is eliminated and the top speed is consequently increased. The reverse procedure would be practiced prior to landing.

Wind tunnel tests have established the facts of decreased landing speed and increased top speed, or the increase in flight range which is the difference between them, and the stability of the airplane in flight with the auxiliary wings in an intermediate position such as that shown at the left side of Fig. 1.

It is particularly to be noted that in the initial period of transition from monoplane to biplane the outer wing sections 15, 15' separate from the lower wings 11, 11' first at their outer ends and progressively separate thereafter with an increasing angle between wings until they are a substantial distance apart. This is of particular advantage in that it eliminates the suction which would be produced between the wings, tending to hold them together, if it were attempted to separate them while maintaining them parallel. Another advantage of my arrangement in folding the auxiliary wings, in part at least, against or into the fuselage is that I am thus enabled to more than double the wing area of the monoplane.

It is to be understood that various modifications may be made in the construction shown in the drawings and above particularly described, within the purview of the invention as defined in the appended claims.

What is claimed is:

1. An airplane comprising a fuselage and a fixed wing thereon, an auxiliary wing having its inner end pivotally mounted on the fuselage with its axis of rotation extending longitudinally thereof and folded against the side thereof in its inoperative position, and means for extending said auxiliary wing outwardly from the fuselage on said pivot and sustaining it in a position to add lift to the airplane when in flight.

2. An airplane comprising a fuselage, a lower set of wings thereon, an auxiliary set of wings each comprising a main section conforming to the top of the corresponding lower wing and a secondary section hinged thereto and to the fuselage and forming with the main section when in elevated position a continuous upper wing separated from the lower wing.

3. A airplane comprising a fuselage, a lower set of wings thereon, an auxiliary set of wings each comprising a main section conforming to the top of the corresponding lower wing and a secondary section hinged thereto and to the fuselage, hinged struts between the lower wings and the main sections of the auxiliary wings, and mechanism operating between the fuselage and the secondary sections of the latter to adjust the auxiliary wings into flying position.

4. The combination with a monoplane type airplane comprising a fuselage having a lower set of wings mounted thereon, recessed in their upper faces, of auxiliary wings nested therein and jointed at their inner ends to companion wing sections extending upwardly and hinged at their upper ends of the fuselage, struts pivoted to the lower wings and the auxiliary wings and means acting on the companion wing sections to simultaneously move the auxiliary wings into flying position.

5. The combination with a monoplane type airplane having a fuselage and a lower set of wings thereon, of auxiliary wings normally resting on the top surfaces of the lower wings and having projecting portions engaging beneath the fuselage, companion wing sections jointed to the auxiliary wings and extending upwardly at the sides of the fuselage and hinged thereto and interlocking with said projections when the auxiliary wings are moved into flying position to limit the movement of said wing sections in one direction.

6. An airplane comprising a fuselage and upper and lower wings thereon, the upper wing structure on each side of the fuselage comprising an inner section hinged to the fuselage longitudinally thereof and an outer section hinged to said inner section, the inner section being foldable against the side of the fuselage and the outer section being foldable against the corresponding lower wing.

7. An airplane comprising a fuselage and upper and lower wings thereon, the upper wing structure on each side of the fuselage comprising an inner section hinged to the fuselage longitudinally thereof and an outer section hinged to said inner section, the outer section comprising the major portion of said upper wing structure and being movable on said hinges into and out of engagement with the corresponding lower wing.

8. An airplane comprising a fuselage and upper and lower wings thereon, the upper wing structure on each side of the fuselage comprising an inner section hinged to the fuselage longitudinally thereof and an outer section hinged to said inner section, the outer section comprising the major portion of said wing structure and being movable on said hinges into and out of engagement with the corresponding lower wing, and mechanism for moving said upper wing structure into and out of operative position.

BYRON T. WALL.